March 7, 1933.   B. S. AIKMAN   1,900,218
STEERING DEVICE
Original Filed Nov. 28, 1927   3 Sheets-Sheet 1
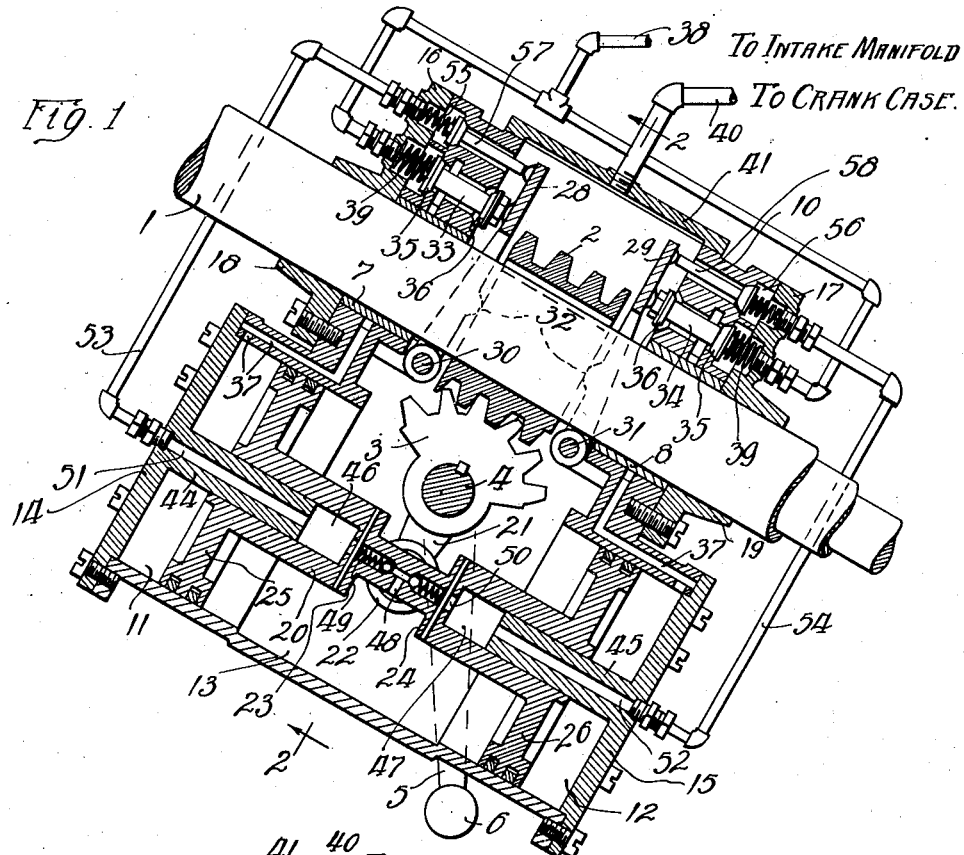
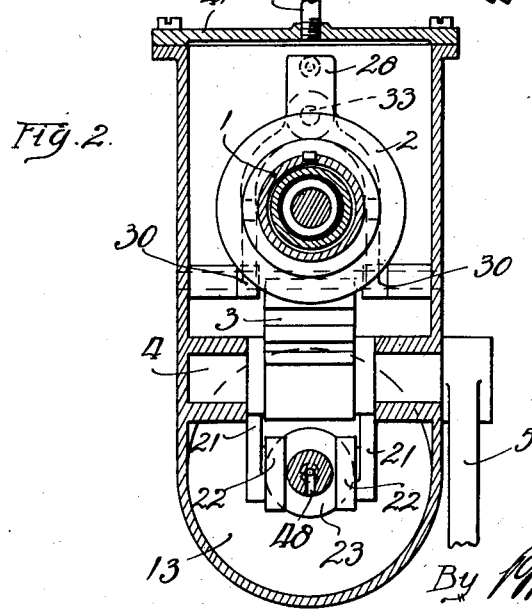
Inventor:
Burton S. Aikman

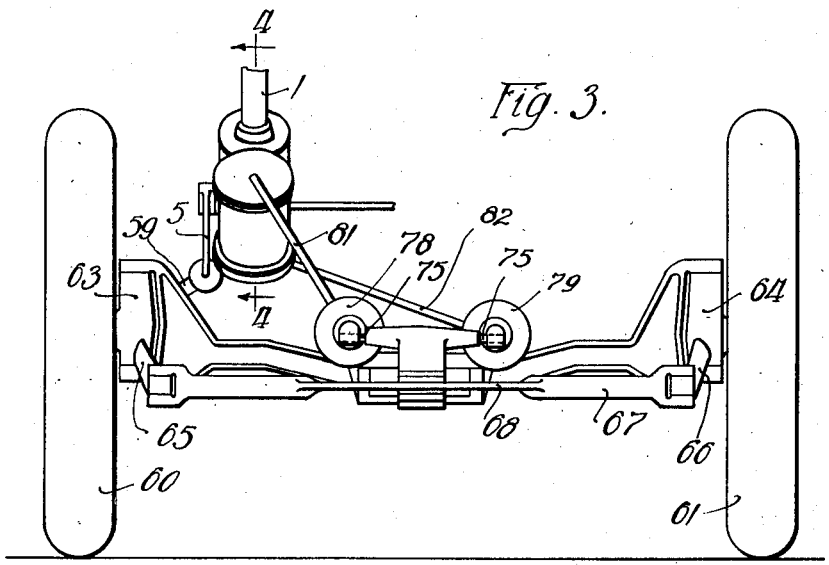

March 7, 1933. B. S. AIKMAN 1,900,218
STEERING DEVICE
Original Filed Nov. 28, 1927    3 Sheets-Sheet 3
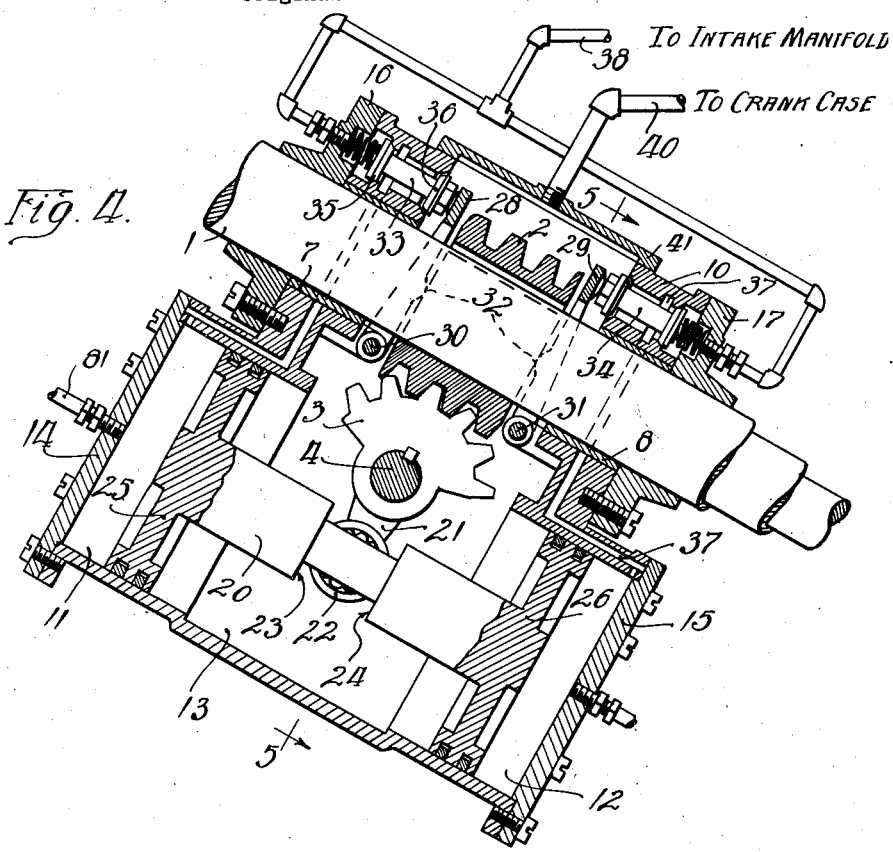
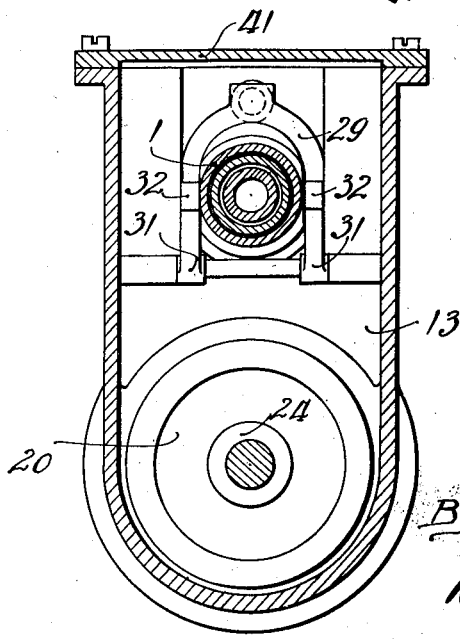
Inventor:
Burton S. Aikman
By
Attys.

Patented Mar. 7, 1933

1,900,218

UNITED STATES PATENT OFFICE

BURTON S. AIKMAN, OF MILWAUKEE, WISCONSIN, ASSIGNOR OF ONE-HALF TO R. P. TELL, OF MILWAUKEE, WISCONSIN

STEERING DEVICE

Original application filed November 28, 1927, Serial No. 236,311. Divided and this application filed October 11, 1928. Serial No. 311,788.

My invention relates to power steering mechanisms employing fluid pressure operated means under the control of the operator to perform a part or all of the work of turning the steering wheel of an automobile or the rudder of a ship or the like steering mechanism in a power operated conveyance.

One phase of my invention comprehends an improved valve control for the fluid pressure motor which operates the steering mechanism. Preferably, I permit the worm on the steering wheel shaft to have a limited longitudinal motion and cause this motion to operate the said control valve. As will be apparent later, this same motion, i. e., the endwise motion of the worm from the given neutral position which is under the control of the operator, is employed to release the fluid locking of the steering mechanism.

According to another phase of my invention, the pressure actuated mechanism for shifting the position of the steering wheel is supplemented with means for locking the steering mechanism in a desired place or position independently of the operating means. When power actuated steering mechanism is to be employed, it is desired to have a relatively lower ratio of worm to sector than is employed in manual steering only, so that the steering operation may be performed more rapidly. While this tends to let the motion of the wheels be made more rapidly, it also tends to permit the reaction of the steering mechanism to operate through the worm and sector, and such reaction must be resisted by the driver, with the result that steering is tiresome. In heavy duty trucks and the like, this tendency is very pronounced.

In the type of power operated steering mechanism to which my invention belongs, the control valves are shifted by turning of the steering shaft and a consequent endwise movement of the worm, which can float a short distance. Since the endwise shifting of the worm actuates the valves, it will be seen that any reaction of the wheels also acts upon the worm and tends to shift it.

According to my invention, a hydraulic lock or stabilizer is used to render the steering mechanism insensitive to road shocks, but sensitive to manual control. Even if the power operation is not employed and if something should go wrong with the same, the wheels of the vehicle can be turned and guided by hand, and the hydraulic lock is operative. In fact, the hydraulic lock may be employed independently of power steering.

The power operated motor may be driven by a vacuum from the engine, and I have illustrated one embodiment employing the same. It may be actuated by oil pressure from the lubricating system of the engine.

This application is a division of my application Serial No. 236,311, filed November 28, 1927, which matured into Patent No. 1,817,903, and is directed to the embodiment employing a motor driven by vacuum from the engine.

Obviously, instead of a hydraulic lock, I may employ an air actuated locking device or stabilizer, and instead of having the same act upon the worm or sector, or immediately adjacent parts, I may arrange the same to operate at any suitable or convenient part of the steering mechanism.

Now, in order to acquaint those skilled in the art with the manner of constructing and operating a device embodying my invention, I shall describe in connection with the accompanying drawings a specific embodiment of the same.

In the drawings:—

Fig. 1 is a vertical longitudinal section of a vacuum operated power steering device employing the hydraulic locking mechanism;

Fig. 2 is a transverse cross-sectional view taken on the line 2—2 of Fig. 1;

Fig. 3 is an elevational view taken from the rear of an automobile looking forward showing a vacuum operated power steering mechanism with a separate stabilizer;

Fig. 4 is a vertical section through the same taken on the line 4—4 of Fig. 3;

Fig. 5 is a transverse section of the device shown in Fig. 4, taken on the line 5—5 of Fig. 4;

Fig. 6 is a plan view of the stabilizing mechanism; and

Fig. 7 is a section taken on the line 7—7 of Fig. 6.

I shall now refer to the device shown in Figs. 1 and 2. This device is a power operated steering mechanism operated by vacuum of the engine to perform a part or all of the work of moving the steering wheel of the vehicle.

The steering wheel shaft 1 is provided with the usual steering wheel in the hands of the operator and this shaft 1 has a worm 2 keyed thereto for limited endwise movement, but rigid for rotational movement.

The worm 2 engages a sector 3 mounted on a shaft 4 and keyed thereto. A steering arm 5 has a ball connection 6 to a drive link (not shown) for operating the dirigible wheels or other steering mechanism of the vehicle.

The steering shaft 1 is supported in bearings 7—8 in a frame or casting 10, the lower part of which is enlarged to provide a pair of cylinders 11 and 12 having a common connecting chamber 13 between them. The upper part of the casting or frame 10 contains valve mechanism, hereinafter referred to, on each side of the worm 2. The cylinders 11 and 12 are closed at their outer ends by head members 14—15, and, likewise, the valve portions have cover members 16 and 17 which embrace the steering shaft 1 as indicated at 18—19 and hold the bearings in position.

A double piston structure 20 is connected to the sector 3 and shaft 4 by means of a short arm 21 which has an anti-friction roller member 22 disposed between the shoulders 23 and 24 formed on the connecting stem between the pistons 25 and 26 so that the piston structure 20 and the shaft 4 with their connected parts are solidly secured together.

The worm 2 lies between two rocker arms 28 and 29 which are pivoted at 30 and 31, respectively, to the main frame member 10. These rocker arms 28, 29 have short projections 32 adapted to be engaged by the worm 2 to actuate the rocker arms.

The rocker arms control the double bead valves 33 and 34 controlling the application of vacuum or atmospheric pressure to the cylinders 11 and 12. The double bead valve 33 has a valve member 35 normally held against its seat to close off the passageway 37 from the vacuum connection 38. The valve is held in this position by a compression spring 39 strong enough to hold the valve on its seat against suction. The passageway 37 leads down through the main frame member 10 to the cylinder 11, and when the valve 33 is in the position shown said cylinder is opened to atmosphere, since the interior of the main frame member 10 is connected to the engine crank case by a connection 40 which extends through the cover member 41.

The double bead valve 34 is constructed like valve 33 and it also controls communication with the vacuum connection 38.

From the above it can be seen that by turning the steering shaft 1 in a clockwise direction to steer the vehicle to the right, the worm 2 will first be forced to the left, as viewed in Fig. 1, acting upon the lever 28 to shift the valve 33, closing off connection with the atmosphere from the cylinder 11 and opening the connection to the valve member 35 to the intake manifold of the engine whereby suction is imposed upon the cylinder 11, this tending to pull the piston 25 to the left, as viewed in Fig. 1, and swinging the gear sector 3 in a clockwise direction, tending to pull the arm 5 back and thus direct the wheels off to the right.

It will be appreciated that the movement of the piston structure 20 as above described will rotate the gear sector 3 slightly in a clockwise direction with the result that the worm 2 is pushed to the right, as viewed in Fig. 1, permitting the valve 33 to shift to close the valve member 35 and open the valve member 36. In other words, the movement of the motor mechanism is in response to the manual operation of the worm 2, and as soon as the desired movement has been made, the device reaches the neutral position.

Likewise, in turning the vehicle to the left, the valve 34 is operated and the movement of the steering arm 5 is in the opposite direction.

Now, I wish to call attention to the fact that any tendency of the dirigible wheels to react through the arm 5 would tend to shift the worm 2 and operate the aforesaid valves if no further means were present. This is because the air in the cylinders 11—12 is readily compressible and, hence, there would be a tendency for the irregularities of the road constantly to react through the sector 3 to shift the worm 2 to operate the valves 33—34. I have provided, however, a locking mechanism which prevents this.

The cylinder heads 14 and 15 have projecting stems 44 and 45 sliding in bores 46 and 47 formed in the connecting stem between the two pistons 25 and 26. These hollow bores 46 and 47 constitute movable cylinders which at all times are maintained full of oil.

The cavity 13 is filled with a suitable grade of lubricating oil and a T-shaped passageway is formed in the connecting stem to permit the introduction of oil into the cylinders 46 and 47. This T-shaped passageway comprises the common inlet 48 and the lateral branches 49 and 50, in which there are arranged suitable inlet check valves to permit the flow of oil in through the passageway 48 and past the corresponding check valve into either cylinder 46 or 47, as the case may be, depending upon the direction of movement of the piston structure 20.

The stems or pistons 44, 45 are hollow to provide passageways 51 and 52 leading through suitable connecting ducts 53 and 54, shown in this case as small copper pipes.

These pipes 53 and 54 lead to valve chambers 55 and 56 in the upper part of the main frame casting 10 and small poppet valves 57 and 58 control communication of the valve boxes 55 and 56 with the interior space.

The levers 28 and 29 are adapted to engage the stems of the valves 57 and 58 to open the same at the time that the valves 33 and 34 are shifted to secure the application of fluid pressure difference to the fluid pressure operated motor.

The valves 57 and 58 are held to their seat by springs, and these valves face in a direction to trap the pressure within the cylinders 46 and 47.

A body of oil is contained in the bottom of the cavity 13 in such a position that it always covers the inlet 48, permitting oil to be drawn into the cylinders 46 or 47 and receiving the oil discharged from one of said cylinders when the piston structure is moved.

With the parts shown in the position indicated in Fig. 1, assume that the vehicle is moving straight ahead, it will now be seen that the cylinder 46 and the cylinder 47 being both full of oil and the valves 57 and 58 being closed and facing in a direction to be seated more firmly by internal pressure, any road shocks transmitted to the steering arm 5 through the drag links, will be incapable of moving the gear sector 3 and, hence, the worm 2, since the piston structure 20 is locked in position by the incompressible liquid trapped in the cylinders 46 and 47.

If, now, the operator wishes to steer to the right, the steering wheel is turned in a clockwise direction, the shaft 1 thereby rotating the worm 2 and tending to move it endwise to the left as viewed in Fig. 1, whereupon, the lever 28 shifts the valve 33 to closed position, and, at the same time, the valve 57 is opened. As a result, suction is imposed on the cylinder 11 and the hydraulic cylinder 46 is free to discharge its contents through the passageway 51, pipe 53, past the valve 57 into the cavity within the device. As a result the piston structure moves over to the left. As it does so the movement of the cylinder 47 to the left draws liquid in through the intake passageway 48 past the corresponding check valve, through the branch connection 50 into the cylinder 47.

The resulting movement of the piston structure shifts the steering arm 5, the drag link and the dirigible wheels to a point where the worm 2 is brought to its central position, the valve 33 being shifted again to its normal position, and the valve 57 closing to trap the hydraulic pressure in the cylinder 46, with the result that the steering device is now locked in the shifted position.

Continuous movement of the worm 2 to keep the valve 33 and the valve 57 in off-normal position, will result in a continuous movement of the piston structure and consequent continuous movement of the steering mechanism.

The worm 2, therefore, becomes a mere control element for controlling the operation of the motor mechanism and the locking mechanism.

However, it is possible to operate the steering mechanism, even if the engine is not running. This is possible because the worm 2 is an actual operating device for the sector 3 and the connected parts. Hence, even if the vehicle were being towed or moved without operation of the engine, it would still be possible to steer the vehicle manually.

The stabilization of the steering gear is a highly desirable function. It may be secured automatically by the use of means acting at a different point from that which I have disclosed, and it need not operate hydraulically.

In Figs. 3 to 7 I have shown a power stabilizing device operated in conjunction with power operated steering mechanism, but acting at a separate point.

In this case, the mechanism shown in Figs. 4 and 5, which comprises the power operating mechanism, is like that shown in Figs. 1 and 2, except that the hydraulic locking or stabilizing mechanism has been omitted. The piston structure 20 is adapted to be moved in the cylinder 11—12 and to impart its motion to the gear sector 3, the shaft 4 and the steering arm 5. The motion of the arm 5 is transmitted through a drag link (not shown) and through an operating arm 59 connected to the hub 63 of the spindles which bear the dirigible wheels 60 and 61. The hubs 63 and 64 have arms 65 and 66 which are connected together by a tie rod 67 which has a flattened portion 68 at the central portion of the same. This central portion 68 is adapted to be gripped between two jaws 69 and 70 which have fibrous friction faces.

The movable jaw 69 is pivoted at 71 to the relatively stationary jaw 70, which stationary jaw is supported on a bracket arm 72 clamped to the bottom of the axle 73. The movable jaw 69 has an upwardly extending arm 74 with pins 75—75 extended out laterally and lying within the hooked ends 76 of the piston rods 77.

Two operating cylinders 78 and 79 are provided, each containing a piston 80 connected to the corresponding piston rod 77. A fluid pressure connecting pipe 81 provides communication between the cylinder 78 and the cylinder 11 of the power operated steering motor. Likewise, the pipe 82 provides communication between the cylinder 79 and the cylinder 12 of the steering motor.

The movable jaw 69 has a spring 85 bearing between the bracket arm 72 and an extension 84 on the arm 74 for urging the two jaws 69 and 70 into clamping engagement with the flattened portion of the tie rod 67.

Now it can be seen that when atmospheric pressure prevails in both cylinders 78 and 79, the clamping spring 85 causes the jaws 69 and 70 to grip the portion 68 of the tie rod to stabilize the steering gear.

Application of vacuum to either cylinder 78 or 79 releases the clamping jaws 69 and 70 and permits the tie rod to shift.

The operation of the device is as follows:—

Assume that the operator intends to turn to the right, he moves the control shaft 1 in a clockwise direction and this results in an endwise movement of the worm 2, shifting the valve 33 to open the valve member 35 and close the valve member 36 so that suction is thereupon applied to the cylinder 11 causing the piston structure 20 to move to the left and, at the same time, causing suction to be applied to the cylinder 78 to release the clutching engagement of the jaws 68 and 69 upon the tie rod 67. The piston structure 20 operates the drag link and turns the steering spindle to a point where the motion of the sector 3 moves the worm 2 back into neutral position. Continuous turning of the control shaft 1 will result in continuous movement of the steering gear.

As soon as the worm 2 has been moved to the neutral or intermediate position, the valve member 33 is shifted to the position shown in Fig. 4, whereupon atmospheric pressure is admitted to the cylinder 11 and to the release cylinder 78, whereupon the jaws 69 and 70 again clamp the tie rod and hold the steering gear in the predetermined position.

The operation of either piston 80 in the cylinder 78 or 79 is able to release the clamping pressure, since the hook members 76 provide sufficient lost motion to permit either one to apply or release the clamping jaws 69—70.

It will be apparent to those skilled in the art that I do not intend to be limited to the details shown and described.

I claim:—

1. In a power operated steering mechanism, a worm shaft, a worm having limited axial motion thereupon, a gear sector engaged by the worm, steering means connected to the sector, a fluid pressure motor connected to said sector, a valve actuated by operation of said worm, and means for locking the steering mechanism to prevent actuation of said worm by the sector.

2. In a power operated steering mechanism, a worm shaft, a worm having limited axial motion thereupon, a gear sector engaged by the worm, steering means connected to the sector, a fluid pressure motor connected to said sector, a valve actuated by operation of said worm for controlling the motor, means for locking the steering mechanism to prevent actuation of said worm by the sector, and a valve operated by the worm for controlling the locking means.

3. In a power steering mechanism, the combination of steering means, a reversible motor for actuating the steering means, control means under the control of the operator for controlling the operation of the reversible motor, and a pair of locking cylinders separate from but actuated conjointly with the motor, said cylinders normally locking the steering mechanism against movement.

4. In combination, steering mechanism, a manually operated member, power operated means for actuating the steering mechanism under the control of said manually actuated member, locking means separate from the power operated means and associated with the steering mechanism for locking the same while the power operated means is inactive, and unlocking control means for the locking means governed by the manually operated element.

5. In a motor vehicle having an internal combustion engine and having a power operated steering mechanism, the combination of a worm shaft, a worm having limited axial motion thereupon, a gear sector engaged by the worm, steering means connected to the gear sector, a motor member connected to the sector and having connection with the intake manifold of the engine, and a valve in said connection actuated by the operation of said worm.

6. In combination, steering mechanism, a manually operated member, power operated means for actuating the steering mechanism, a valve for controlling said power operated means, locking means normally locking said steering mechanism, a second valve for controlling said locking means, and means controlled by said member for controlling both valves simultaneously.

7. In combination, a steering mechanism, a movable member for controlling said steering mechanism, said member having a cavity on one side, a body of liquid entrapped in said cavity, means for reducing the pressure on one side of said member, a valve for controlling said pressure reducing means, and a second valve for controlling the trapped body of liquid whereby when the valve is closed movement of said member is prevented.

8. In combination, a steering mechanism, a movable member for controlling said steering mechanism, said member having a cavity on one side, a body of liquid entrapped in said cavity, means for reducing the pressure on one side of said member, a valve for controlling said pressure reducing means, and a second valve for controlling the trapped body of liquid whereby when the valve is closed movement of said member is prevented, a steering shaft, and means actuated by the movement of said shaft for operating both said valves simultaneously.

9. In combination, a steering shaft, a steering mechanism, a movable member for controlling said steering mechanism, said member having a cavity on each side, bodies of liquid entrapped in each cavity, means controlled by said shaft for unbalancing the pressures on the two sides of said member to cause movement of said member, valves controlled by said shaft for controlling the escape of liquid from said cavities, and a valve in each cavity for controlling the admission of liquid into the cavity whereby when said last mentioned valve in either cavity is closed movement of said movable member is prevented.

10. In combination, a control shaft, a gear member on the shaft, steering mechanism, a second gear cooperating with the first gear for actuating the steering mechanism, said first gear having limited motion with respect to said shaft, a fluid pressure motor for operating the steering mechanism, locking means for locking the steering mechanism, and means controlled by the limited motion of said first gear for simultaneously starting the motor and unlocking the locking mechanism.

11. In a motor vehicle, a steering mechanism, power means for operating said mechanism from power derived from the motor of the vehicle, manually operated means for controlling said power means whereby the vehicle may be steered at will, and locking means separate from said steering mechanism, operating means for locking the latter when the control means is inactive, said locking means including means for releasing the locking means responsive to the operation of the manually operated means.

12. In a motor vehicle, a steering mechanism, power means for operating said mechanism from power derived from the motor of the vehicle, manually operated means for controlling said power means whereby the vehicle may be steered at will, and locking means separate from said steering mechanism, operating means for locking the latter when the control means is inactive, said locking means being actuated by power derived from the motor of the vehicle and including means for releasing the locking means responsive to the operation of the manually operated means.

In witness whereof, I hereunto subscribe my name this 5th day of October, 1928.

BURTON S. AIKMAN.